(12) United States Patent
Kato et al.

(10) Patent No.: US 9,458,914 B2
(45) Date of Patent: Oct. 4, 2016

(54) AUTOMATIC TRANSMISSION (71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Takayoshi Kato, Handa (JP); Toshihiko Aoki, Anjo (JP); Hiroshi Kato, Kariya (JP); Nobutada Sugiura, Nishio (JP); Takashi Morimoto, Gamagori (JP); Nobukazu Ike, Kariya (JP); Satoru Kasuya, Nishio (JP); Terufumi Miyazaki, Toyota (JP); Masaru Morise, Nakita (JP); Shinji Oita, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/766,315

(22) PCT Filed: Mar. 27, 2014

(86) PCT No.: PCT/JP2014/058743
§ 371 (c)(1),
(2) Date: Aug. 6, 2015

(87) PCT Pub. No.: WO2014/157453
PCT Pub. Date: Oct. 2, 2014

(65) Prior Publication Data
US 2015/0377326 A1 Dec. 31, 2015

(30) Foreign Application Priority Data

Mar. 28, 2013 (JP) ................. 2013-070468

(51) Int. Cl.
F16H 3/62 (2006.01)
F16H 3/66 (2006.01)

(52) U.S. Cl.
CPC .............. *F16H 3/666* (2013.01); *F16H 3/66* (2013.01); *F16H 2200/0078* (2013.01); *F16H 2200/2012* (2013.01); *F16H 2200/2046* (2013.01)

(58) Field of Classification Search
CPC .. F16H 3/666; F16H 3/66; F16H 2200/0078; F16H 2200/2012; F16H 2200/2046
See application file for complete search history.

(56) References Cited

U.S. PATENT DOCUMENTS

| 8,007,394 | B2* | 8/2011 | Phillips | F16H 3/66 475/275 |
| 8,409,045 | B1* | 4/2013 | Mellet | F16H 3/66 475/280 |
| 8,715,129 | B1* | 5/2014 | Coffey | F16H 3/66 475/208 |
| 8,758,187 | B2* | 6/2014 | Mellet | F16H 3/666 475/280 |

(Continued)

FOREIGN PATENT DOCUMENTS

| DE | 102010063490 A1 | 6/2012 |
| JP | 2002-206601 A | 7/2002 |

(Continued)

*Primary Examiner* — David J Hlavka
(74) *Attorney, Agent, or Firm* — Oliff PLC (57) ABSTRACT

An automatic transmission that shifts power applied to an input member and outputs the shifted power to an output member, the automatic transmission including a first planetary gear mechanism, a third planetary gear mechanism, a compound planetary gear mechanism, a first clutch, a second clutch, a third clutch, a fourth clutch a first brake, and a second brake.

6 Claims, 5 Drawing Sheets

(56) References Cited

U.S. PATENT DOCUMENTS

| | | | |
|---|---|---|---|
| 8,840,520 B2* | 9/2014 | Neelakantan | F16H 59/38 475/280 |
| 9,039,556 B2* | 5/2015 | Borgerson | F02N 11/04 475/280 |
| 2002/0091032 A1 | 7/2002 | Hayabuchi et al. | |
| 2004/0048716 A1 | 3/2004 | Ziemer | |
| 2009/0124448 A1* | 5/2009 | Wittkopp | F16H 3/66 475/275 |
| 2010/0144486 A1 | 6/2010 | Hart et al. | |
| 2013/0203548 A1* | 8/2013 | Mellet | F16H 3/666 475/276 |
| 2013/0203551 A1* | 8/2013 | Mellet | F16H 3/666 475/280 |
| 2013/0260935 A1* | 10/2013 | Mellet | F16H 37/065 475/5 |
| 2013/0260945 A1 | 10/2013 | Fellmann et al. | |
| 2013/0267371 A1* | 10/2013 | Mellet | F16H 3/62 475/276 |
| 2013/0310212 A1* | 11/2013 | Hart | F16D 27/04 475/276 |
| 2014/0057753 A1* | 2/2014 | Hart | F16H 3/66 475/278 |

FOREIGN PATENT DOCUMENTS

| | | |
|---|---|---|
| JP | 2004-529297 A | 9/2004 |
| JP | 2009-210087 A | 9/2009 |
| JP | 2010-203536 A | 9/2010 |
| WO | 2010/084373 A1 | 7/2010 |
| WO | 2012/084373 A1 | 6/2012 |

* cited by examiner

| OPERATION TABLE | C1 | C2 | C3 | C4 | B1 | B2 | GEAR RATIO | STEP RATIO |
|---|---|---|---|---|---|---|---|---|
| 1st | ○ |  | ○ |  | ○ |  | 4.538 |  |
| 2nd |  | ○ | ○ |  | ○ |  | 3.000 | 1.513 |
| 3rd | ○ | ○ |  |  | ○ |  | 2.231 | 1.345 |
| 4th |  | ○ |  | ○ | ○ |  | 1.800 | 1.239 |
| 5th | ○ |  |  | ○ | ○ |  | 1.299 | 1.386 |
| 6th | ○ |  | ○ | ○ |  |  | 1.000 | 1.299 |
| 7th | ○ |  |  | ○ |  | ○ | 0.866 | 1.155 |
| 8th |  | ○ |  | ○ |  | ○ | 0.769 | 1.126 |
| 9th | ○ | ○ |  |  |  | ○ | 0.729 | 1.055 |
| 10th |  | ○ | ○ |  |  | ○ | 0.690 | 1.057 |
| 11th | ○ |  | ○ |  |  | ○ | 0.655 | 1.053 |
| 12th |  |  | ○ | ○ |  | ○ | 0.531 | 1.234 |
| Rev |  |  | ○ | ○ | ○ |  | -3.214 | 0.708 |

AUTOMATIC TRANSMISSION

BACKGROUND

The disclosure relates to automatic transmissions that shifts power applied to an input member and output the shifted power to an output member.

In recent years, in order to improve fuel economy and acceleration performance of vehicles, multi-speed automatic transmissions have been developed as stepped automatic transmissions that are mounted on the vehicles. An automatic transmission that attains twelve forward speeds and a reverse speed by using four planetary gear mechanisms and six engagement elements comprised of three clutches and three brakes is conventionally proposed as such a stepped automatic transmission (see US 2010/0144486).

SUMMARY

In general, the larger the number of shift speeds is, the wider the ratio spread (speed ratio range; hereinafter simply referred to as the "spread") of such automatic transmissions is, making it possible to shift to an optimal gear speed.

Planetary gear mechanisms include single-pinion type planetary gear mechanisms and double-pinion type planetary gear mechanisms. As compared to the double-pinion type planetary gear mechanisms in which two pinion gears are arranged next to each other in the radial direction, the single-pinion type planetary gear mechanisms have a simpler structure and smaller meshing loss as the pinion gears do not mesh with each other. It is therefore desired to use as many single-pinion type planetary gear mechanisms as possible to form an automatic transmission.

Moreover, drag loss is caused even when these engagement elements are in a disengaged state. It is therefore desired to reduce as much as possible the number of engagement elements to be disengaged at each shift speed. It is also desired that those engagement elements which cause great drag loss be engaged at a shift speed that is frequently used.

In US 2010/0144486, a twelve forward speed automatic transmission is formed by using four planetary gear mechanisms and six engagement elements. However, the automatic transmission can be designed in countless ways by using the four planetary gear mechanisms and the six engagement elements, and it is very difficult to find an automatic transmission having as many functions as possible which are desirable for such an automatic transmission as described above.

The present disclosure according to an exemplary aspect provides a new automatic transmission capable of attaining twelve forward speeds and one reverse speed by using four planetary gear mechanisms and six engagement elements.

An automatic transmission that shifts power applied to an input member and outputs the shifted power to an output member, according to an exemplary aspect includes a first planetary gear mechanism having a first rotary element, a second rotary element, and a third rotary element in order of an interval corresponding to a gear ratio in a speed diagram; a third planetary gear mechanism having a fourth rotary element, a fifth rotary element, and a sixth rotary element in order of an interval corresponding to a gear ratio in a speed diagram; a compound planetary gear mechanism formed by a second planetary gear mechanism and a fourth planetary gear mechanism, and having a seventh rotary element, an eighth rotary element, a ninth rotary element, and a tenth rotary element in order of an interval corresponding to a gear ratio in a speed diagram; a first clutch capable of engaging the third rotary element with the tenth rotary element and disengaging the third rotary element from the tenth rotary element; a second clutch capable of engaging the third rotary element with the sixth rotary element and disengaging the third rotary element from the sixth rotary element; a third clutch capable of engaging the second rotary element with the sixth rotary element and disengaging the second rotary element from the sixth rotary element; a fourth clutch capable of engaging the first rotary element and the fourth rotary element with the seventh rotary element and disengaging the first rotary element and the fourth rotary element from the seventh rotary element; a first brake that engages the tenth rotary element with an automatic transmission case so that the tenth rotary element can be held stationary with respect to the automatic transmission case, and that disengages the tenth rotary element from the automatic transmission case; and a second brake that engages the seventh rotary element with the automatic transmission case so that the seventh rotary element can be held stationary with respect to the automatic transmission case, and that disengages the seventh rotary element from the automatic transmission case, wherein the first rotary element is constantly coupled to the fourth rotary element, the fifth rotary element is constantly coupled to the ninth rotary element, the input member is coupled to the eighth rotary element, and the output member is coupled to the second rotary element.

Configuring the automatic transmission in this manner allows twelve forward speeds and one reverse speed to be attained by using the four planetary gear mechanisms, the four clutches, and the two brakes. This can increase the gear spread from the lowest shift speed to the highest shift speed, and can improve acceleration performance and fuel economy performance of vehicles.

Each shift speed is attained by engaging three of the six engagement elements and disengaging the remaining three engagement elements. Accordingly, the number of engagement elements to be disengaged to attain a shift speed is relatively small, which can reduce drag loss that is caused by the disengaged engagement elements, and can improve transmission efficiency of the automatic transmission.

Moreover, in the above automatic transmission, the four planetary gear mechanisms can be, e.g., single-pinion type planetary gear mechanisms. The use of the single-pinion type planetary gear mechanisms can reduce gear meshing loss and can thus improve the transmission efficiency of the automatic transmission. The use of the single-pinion type planetary gear mechanisms can also reduce the number of components and can thus reduce assembly time and cost of the automatic transmission.

DETAILED DESCRIPTION OF THE EMBODIMENTS

First Embodiment

Figure 1:
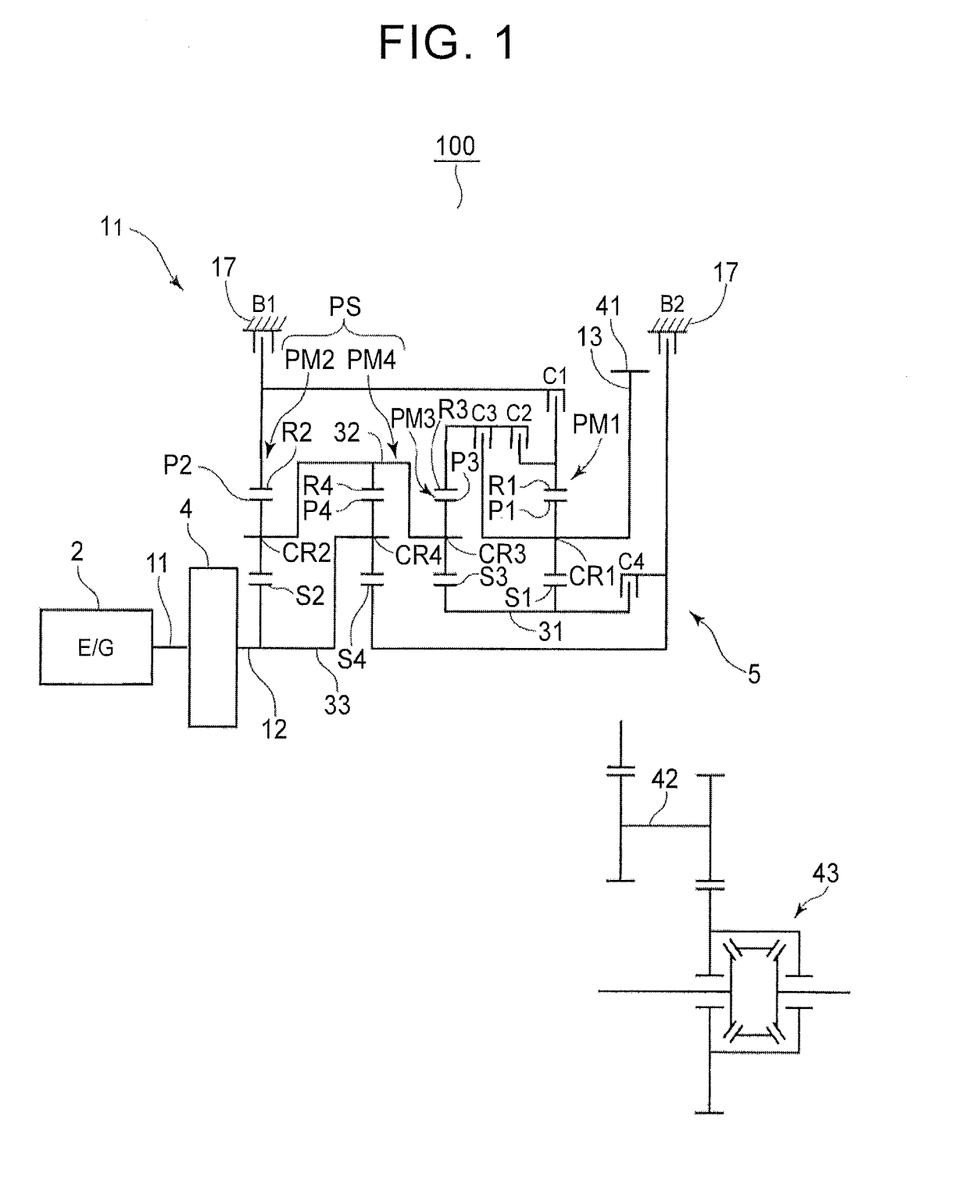
FIG. 1 is a skeleton diagram showing an automatic transmission according to a first embodiment.

An automatic transmission $1_1$ according to a first embodiment will be described below with reference to FIGS. 1 to 3. First, the general configuration of the automatic transmission $1_1$ will be described with reference to FIG. 1. As shown in FIG. 1, the automatic transmission $1_1$ that is preferably used in, e.g., a front engine, front drive (FF) vehicle 100 has an input shaft 11 of the automatic transmission $1_1$ which can be connected to an internal combustion engine (drive source) 2. The automatic transmission $1_1$ includes about the axial direction of the input shaft 11 a starting device 4 such as a torque converter and a speed change mechanism 5.

The speed change mechanism 5 is a stepped speed change mechanism that includes four single-pinion type planetary gear mechanisms PM1 to PM4, four clutches C1, C2, C3, C4, and two brakes B1, B2, and that receives power from the internal combustion engine 2 via an input shaft (input member) 12 drivingly coupled to the starting device 4 and shifts the received power to output the shifted power from an output shaft 13 as an output member between the first planetary gear mechanism PM1 and the second brake B2 and a counter gear 41. The power output from the output shaft (output member) 13 is output to a countershaft 42 via the counter gear 41, and the power output to the countershaft 42 is transmitted to driving wheels via a differential unit 43.

As shown in FIG. 1, the above planetary gear mechanisms PM1 to PM4 are arranged on the input shaft 12 in order of the second planetary gear mechanism PM2, the fourth planetary gear mechanism PM4, the third planetary gear mechanism PM3, and the first planetary gear mechanism PM1 from left to right in the figure, namely from the front to the rear of the vehicle. The second planetary gear mechanism PM2 and the fourth planetary gear mechanism PM4 form a compound planetary gear mechanism PS in which two of rotary elements of the second planetary gear mechanism PM2 are constantly coupled to two of rotary elements of the fourth planetary gear mechanism PM4 so that the compound planetary gear mechanism PS has four rotary elements.

The first planetary gear mechanism PM1 is a single-pinion type planetary gear mechanism, which includes a first sun gear S1 (first rotary element), a first carrier CR1 (second rotary element), and a first ring gear R1 (third rotary element), and in which a plurality of pinion gears P1 (first pinion gears) each meshing with the first sun gear S1 and the first ring gear R1 are arranged in the circumferential direction, and the first carrier CR1 holds the pinion gears P1 so that the pinion gears P1 can rotate and revolve.

Figure 3:
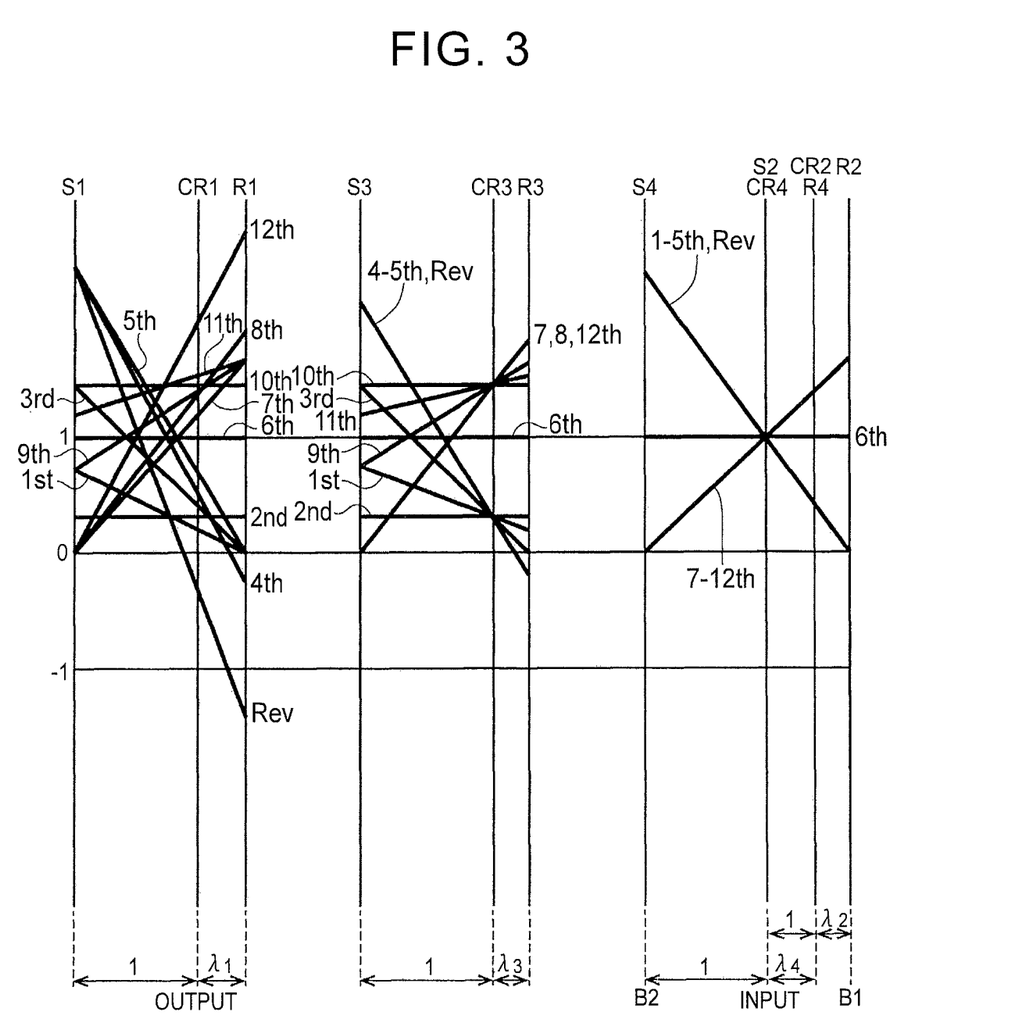
FIG. 3 is a speed diagram of the automatic transmission according to the first embodiment.

Since the first planetary gear mechanism PM1 is of a single-pinion type, the three rotary elements, namely the first sun gear S1, the first ring gear R1, and the first carrier CR1, are shown in order of the first sun gear S1, the first carrier CR1, and the first ring gear R1 according to the interval corresponding to the gear ratio in a speed diagram (see FIG. 3). The gear ratio $\lambda_1$ of the first planetary gear mechanism PM1 (the number of teeth of the first sun gear S1/the number of teeth of the first ring gear R1) is set to, e.g., 0.45.

Like the first planetary gear mechanism PM1, the third planetary gear mechanism PM3 is also configured as a single-pinion type planetary gear mechanism, and includes as three rotary elements a third sun gear S3 (fourth rotary element), a third ring gear R3 (sixth rotary element), and a third carrier CR3 (fifth rotary element) that couples a plurality of pinion gears P3 (third pinion gears) and holds the pinion gears P3 so that the pinion gears P3 can rotate and revolve. The three rotary elements of the third planetary gear mechanism PM3, namely the third sun gear S3, the third ring gear R3, and the third carrier CR3, are shown in order of the third sun gear S3, the third carrier CR3, and the third ring gear R3 according to the interval corresponding to the gear ratio in the speed diagram. The gear ratio $\lambda_3$ of the third planetary gear mechanism PM3 (the number of teeth of the third sun gear S3/the number of teeth of the third ring gear R3) is set to, e.g., 0.3.

Like the first and third planetary gear mechanisms PM1, PM3, the second planetary gear mechanism PM2 is also configured as a single-pinion type planetary gear mechanism, and includes as three rotary elements a second sun gear S2 (eighth rotary element), a second ring gear R2 (tenth rotary element), and a second carrier CR2 (ninth rotary element) that couples a plurality of pinion gears P2 (second pinion gears) and holds the pinion gears P2 so that the pinion gears P2 can rotate and revolve. Like the first to third planetary gear mechanisms PM1 to PM3, the fourth planetary gear mechanism PM4 is also configured as a single-pinion type planetary gear mechanism, and includes as three rotary elements a fourth sun gear S4 (seventh rotary element), a fourth ring gear R4 (ninth rotary element), and a fourth carrier CR4 (eighth rotary element) that couples a plurality of pinion gears P4 (fourth pinion gears) and holds the pinion gears P4 so that the pinion gears P4 can rotate and revolve. The second planetary gear mechanism PM2 and the fourth planetary gear mechanism PM4 form the compound planetary gear mechanism PS in which the second sun gear S2 is constantly coupled to the fourth carrier CR4, and the second carrier CR2 is constantly coupled to the fourth ring gear R4 so that the compound planetary gear mechanism PS has four rotary elements, namely the fourth sun gear S4, the second sun gear S2 and the fourth carrier CR4, the second carrier CR2 and the fourth ring gear R4, and the second ring gear R2.

The three rotary elements of the second planetary gear mechanism PM2, namely the second sun gear S2, the second ring gear R2, and the second carrier CR2, are shown in order of the second sun gear S2, the second carrier CR2, and the second ring gear R2 according to the interval corresponding to the gear ratio in the speed diagram. The three rotary elements of the fourth planetary gear mechanism PM4, namely the fourth sun gear S4, the fourth ring gear R4, and the fourth carrier CR4, are shown in order of the fourth sun gear S4, the fourth carrier CR4, and the fourth ring gear R4 according to the interval corresponding to the gear ratio in the speed diagram. The gear ratio $\lambda_2$ of the second planetary gear mechanism PM2 (the number of teeth of the second sun gear S2/the number of teeth of the second ring gear R2) is set to, e.g., 0.5. The gear ratio $\lambda_4$ of the fourth planetary gear mechanism PM4 (the number of teeth of the fourth sun gear S4/the number of teeth of the fourth ring gear R4) is set to, e.g., 0.45. In the speed diagram of FIG. 3, the second sun gear S2 and the second carrier CR2 of the three rotary elements of the second planetary gear mechanism PM2 are constantly coupled to the fourth carrier CR4 and the fourth ring gear R4 of the three rotary elements of the fourth planetary gear mechanism PM4, respectively, so that the second sun gear S2 and the fourth carrier CR4 make the same rotation, and the second carrier CR2 and the fourth ring gear R4 make the same rotation. Accordingly, the fourth sun gear S4, the second sun gear S2 and the fourth carrier CR4, the second carrier CR2 and the fourth ring gear R4, and the second ring gear R2 are shown corresponding to the four rotary elements.

The first sun gear S1 and the third sun gear S3 are coupled by a first coupling element 31, and the second carrier CR2, the third carrier CR3, and the fourth ring gear R4 are coupled by a second coupling element 32. The second sun gear S2 and the fourth carrier CR4 are coupled by a third coupling element 33. The input shaft 12 is coupled to the third coupling element 33, so that rotation from the internal combustion engine 2 is applied to the third coupling element 33. Moreover, the first carrier CR1 is coupled to the output shaft 13.

In addition, the first clutch C1 can engage the first ring gear R1 with the second ring gear R2 and can disengage the first ring gear R1 from the second ring gear R2. That is, the first ring gear R1 and the second ring gear R2 are coupled to each other by engaging the first clutch C1, and are decoupled from each other by disengaging the first clutch C1.

The second clutch C2 can engage the first ring gear R1 with the third ring gear R3 and can disengage the first ring gear R1 from the third ring gear R3. That is, the first ring gear R1 and the third ring gear R3 are coupled to each other by engaging the second clutch C2, and are decoupled from each other by disengaging the second clutch C2.

The third clutch C3 can engage the first carrier CR1 with the third ring gear R3 and can disengage the first carrier CR1 from the third ring gear R3. That is, the first carrier CR1 and the third ring gear R3 are coupled to each other by engaging the third clutch C3, and are decoupled from each other by disengaging the third clutch C3.

The fourth clutch C4 can engage the first coupling element 31 (i.e., the first sun gear S1 and the third sun gear S3) with the fourth sun gear S4 and can disengage the first coupling element 31 from the fourth sun gear S4. That is, the first coupling element 31 and the fourth sun gear S4 are coupled to each other by engaging the fourth clutch C4, and are decoupled from each other by disengaging the fourth clutch C4.

The first brake B1 can engage the second ring gear R2 with an automatic transmission case 17 so that the second ring gear R2 can be held stationary with respect to the automatic transmission case 17, and can disengage the second ring gear R2 from the automatic transmission case 17. That is, the second ring gear R2 is held stationary with respect to the automatic transmission case 17 by engaging the first brake B1, and is allowed to rotate by disengaging the first brake B1.

The second brake B2 can engage the fourth sun gear S4 with the automatic transmission case 17 so that the fourth sun gear S4 can be held stationary with respect to the automatic transmission case 17, and can disengage the fourth sun gear S4 from the automatic transmission case 17. That is, the fourth sun gear S4 is held stationary with respect to the automatic transmission case 17 by engaging the second brake B2, and is allowed to rotate by disengaging the second brake B2.

The speed change mechanism 5 thus configured can switch among first to twelfth forward speeds and a reverse speed by combination of engagement and disengagement of the four clutches C1 to C4 and the two brakes B1, B2. Functions of the speed change mechanism 5 will be described below with reference to FIGS. 1 to 3.

In the speed diagram shown in FIG. 3, the ordinate represents the rotational speed of each rotary element (each gear), and the abscissa corresponds to the gear ratio of each rotary element. In FIG. 3, the speed diagram of the first planetary gear mechanism PM1, the speed diagram of the third planetary gear mechanism PM3, and the speed diagram of the second planetary gear mechanism PM2 and the fourth planetary gear mechanism PM4 (compound planetary gear mechanism PS) are shown in this order from left to right, and the sun gear, the carrier, and the ring gear are shown in this order in the speed diagram of each planetary gear mechanism.

Figure 2:
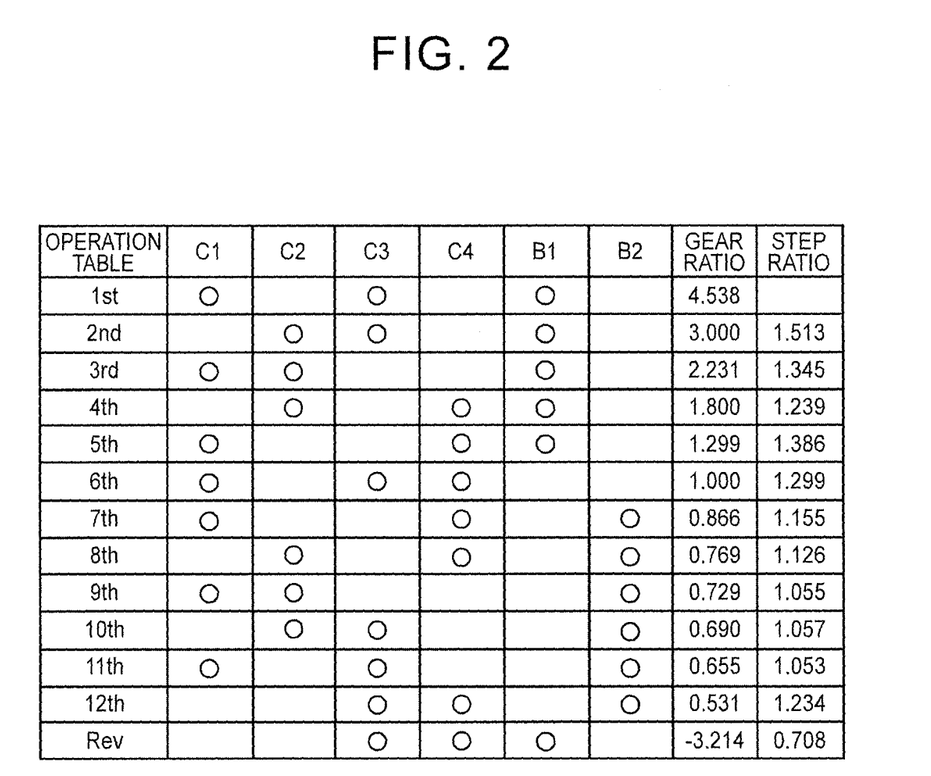
FIG. 2 is an engagement table of the automatic transmission according to the first embodiment.

For example, at the first forward speed (1st) in a drive (D) range, as shown in FIG. 2, the first and third clutches C1, C3 and the first brake B1 are engaged, and the second and fourth clutches C2, C4 and the second brake B2 are disengaged. As shown in FIGS. 1 and 3, the second ring gear R2 is thus held stationary by the first brake B1, whereby input rotation applied to the second sun gear S2 is reduced in speed. The input rotation thus reduced in speed is output to the second carrier CR2 and is applied to the third carrier CR3 via the second coupling element 32. Since the first clutch C1 is engaged, the first ring gear R1 is also held stationary by the first brake B1, and the third ring gear R3 and the first carrier CR1 are coupled by the third clutch C3. Moreover, since the third sun gear S3 and the first sun gear S1 are coupled by the first coupling element 31, the rotation applied to the third carrier CR3 is reduced in speed by the third and first planetary gear mechanisms PM3, PM1 and is output from the first carrier CR1. The output shaft 13 thus rotates so that the gear ratio becomes equal to 4.538 as the first forward speed.

At the second forward speed (2nd), the second and third clutches C2, C3 and the first brake B1 are engaged, and the first and fourth clutches C1, C4 and the second brake B2 are disengaged. As in the case of the first forward speed, the second ring gear R2 is thus held stationary by the brake B1, whereby input rotation applied to the second sun gear S2 is reduced in speed. The input rotation thus reduced in speed is output to the second carrier CR2 and is applied to the third carrier CR3 via the second coupling element 32. Since both the second and third clutches C2, C3 are engaged, the first planetary gear mechanism PM1 is in a directly coupled state. Moreover, since the first sun gear S1 is coupled to the third sun gear S3, the rotation applied to the third carrier CR3 is reduced in speed and is output from the third ring gear R3. This rotation is output as it is to the first carrier CR1, and the first carrier CR1 rotates at a rotational speed higher than that at the first forward speed. The output shaft 13 thus rotates so that the gear ratio becomes equal to 3.000 as the second forward speed.

At the third forward speed (3rd), the first and second clutches C1, C2 and the first brake B1 are engaged, and the third and fourth clutches C3, C4 and the second brake B2 are disengaged. The second ring gear R2 is thus held stationary by the first brake B1. Moreover, since the first and second clutches C1, C2 are engaged, the first ring gear R1 and the third ring gear R3 are also held stationary by the first brake B1. Accordingly, input rotation of the second sun gear S2 is reduced in speed and is output from the second carrier CR2 to the third carrier CR3. This rotation of the third carrier CR3 is increased in speed and is output from the third sun gear S3 to the first sun gear S1. Since the first ring gear R1 is held stationary as described above, the rotation of the first sun gear S1 is reduced in speed and is output from the first carrier CR1. The first carrier CR1 rotates at a reduced rotational speed higher than that at the second forward speed. The output shaft 13 thus rotates so that the gear ratio becomes equal to 2.231 as the third forward speed.

At the fourth forward speed (4th), the second and fourth clutches C2, C4 and the first brake B1 are engaged, and the first and third clutches C1, C3 and the second brake B2 are disengaged. The second ring gear R2 is thus held stationary by the first brake B1. Moreover, since the fourth clutch C4 is engaged, the fourth sun gear S4 is coupled to the first coupling element (i.e., the first and third sun gears S1, S3) 31. Accordingly, input rotation applied to the second sun gear S2 is reduced in speed and is output to the second coupling element 32 via the second carrier CR2. Moreover, the input rotation applied to the fourth carrier CR4 is also reduced in speed and is similarly output from the fourth ring gear R4 to the second coupling element 32. The first and third sun gears S1, S3 make the same rotation as the fourth sun gear S4 that is increased in rotational speed. Accordingly, the rotation reduced in speed and output to the third carrier CR3 via the second coupling element 32 is output as reverse rotation slightly reduced in speed from the third ring gear R3, and is output to the first ring gear R1 via the second clutch C2. The first carrier CR1 thus rotates at a rotational speed slightly higher than that at the third forward speed, and the output shaft 13 rotates so that the gear ratio becomes equal to 1.800 as the fourth forward speed.

At the fifth forward speed (5th), the first and fourth clutches C1, C4 and the first brake B1 are engaged, and the second and third clutches C2, C3 and the second brake B2 are disengaged. As in the case of the fourth forward speed, the second ring gear R2 is thus held stationary by the first brake B1. Moreover, since the fourth clutch C4 is engaged, the fourth sun gear S4 is coupled to the first coupling element (i.e., the first and third sun gears S1, S3) 31. Accordingly, input rotation applied to the second sun gear S2 is reduced in speed and is output to the second coupling element 32 via the second carrier CR2. Moreover, the input rotation applied to the fourth carrier CR4 is also reduced in speed and is similarly output from the fourth ring gear R4 to the second coupling element 32. The first and third sun gears S1, S3 make the same rotation as the fourth sun gear S4 that is increased in rotational speed. The first ring gear R1 is held stationary by the first brake B1 via the first clutch C1. Accordingly, when the rotation increased in speed is applied to the first sun gear S1, this rotation is reduced in speed, and the first carrier CR1 rotates at a rotational speed slightly higher than that at the fourth forward speed. The output shaft 13 thus rotates so that the gear ratio becomes equal to 1.299 as the fifth forward speed.

At the sixth forward speed (6th), the first, third, and fourth clutches C1, C3, C4 are engaged, and the second clutch C2 and the first and second brakes B1, B2 are disengaged. The first ring gear R1 is thus coupled to the second ring gear R2 by the first clutch C1, the first carrier CR1 is coupled to the third ring gear R3 by the third clutch C3, and the first and third sun gears S1, S3 is coupled to the fourth sun gear S4 by the fourth clutch C4. Accordingly, the first to fourth planetary gear mechanisms PM1 to PM4 are in a directly coupled state, and input rotation applied from the second sun gear S2 and the fourth carrier CR4 is output as it is from the first carrier CR1. The output shaft 13 thus rotates so that the gear ratio becomes equal to 1.000 as the sixth forward speed.

At the seventh forward speed (7th), the first and fourth clutches C1, C4 and the second brake B2 are engaged, and the second and third clutches C2, C3 and the first brake B1 are disengaged. Since the second brake B2 and the fourth clutch C4 are engaged, the fourth sun gear S4 is held stationary, and the first sun gear S1 is also held stationary. Input rotation of the fourth carrier CR4 is therefore increased in speed via the fourth ring gear R4 and is applied to the second carrier CR2. Since the input rotation is also applied to the second sun gear S2, the second ring gear R2 rotates at a rotational speed increased with respect to the second sun gear S2 and the second carrier CR2. Since the first clutch C1 is engaged, the rotation of the second ring gear R2 thus increased in speed is output to the first ring gear R1. Since the first sun gear S1 is held stationary by the second brake B2, the first carrier CR1 rotates at an increased rotational speed slightly reduced with respect to the second carrier CR2. The output shaft 13 thus rotates so that the gear ratio becomes equal to 0.866 as the seventh forward speed.

At the eighth forward speed (8th), the second and fourth clutches C2, C4 and the second brake B2 are engaged, and the first and third clutches C1, C3 and the first brake B1 are disengaged. Since the second brake B2 and the fourth clutch C4 are engaged, the fourth sun gear S4 is held stationary, and the first and third sun gears S1, S3 are also held stationary. Accordingly, input rotation of the fourth carrier CR4 is increased in speed via the fourth ring gear R4 and is applied to the third carrier CR3. Since the third sun gear S3 is held stationary, the rotation thus applied to the third carrier CR3 is output to the first ring gear R1 via the third ring gear R3 and the second clutch C2. Since the first sun gear S1 is held stationary, the first carrier CR1 rotates at a rotational speed higher than that at the seventh forward speed. The output shaft 13 thus rotates so that the gear ratio becomes equal to 0.769 as the eighth forward speed.

At the ninth forward speed (9th), the first and second clutches C1, C2 and the second brake B2 are engaged, and the third and fourth clutches C3, C4 and the first brake B1 are disengaged. Since the fourth sun gear S4 is held stationary by the second brake B2, input rotation of the fourth carrier CR4 is increased in speed via the fourth ring gear R4 and is applied to the second coupling element 32 (i.e., the second carrier CR2 and the third carrier CR3). Since the input rotation is also applied to the second sun gear S2 similarly to the fourth carrier CR4, rotation of the second ring gear R2 is increased in speed with respect to the second sun gear S2 and the second carrier CR2, and the rotation thus increased in speed is output to the first ring gear R1 via the first clutch C1 and to the third ring gear R3 via the first and second clutches C1, C2. Rotation of the third sun gear S3 is reversed and reduced in speed by the input rotation of the third carrier CR3 and the third ring gear R3, whereby rotation of the first sun gear S1 is determined. Due to the input rotation from the first ring gear R1 and the first sun gear S1, the first carrier CR1 rotates at a rotational speed higher than that at the eighth forward speed. The output shaft 13 thus rotates so that the gear ratio becomes equal to 0.729 as the ninth forward speed.

At the tenth forward speed (10th), the second and third clutches C2, C3 and the second brake B2 are engaged, and the first and fourth clutches C1, C4 and the first brake B1 are disengaged. Since the fourth sun gear S4 is held stationary by the second brake B2, input rotation from the fourth carrier CR4 is increased in speed and is output to the third carrier CR3 via the fourth ring gear R4. Since the second and third clutches C2, C3 are engaged, the first and third planetary gear mechanisms PM1, PM3 are in a directly coupled state, and the rotation of the third carrier CR3 increased in speed is output as it is from the first carrier CR1. The output shaft 13 thus rotates so that the gear ratio becomes equal to 0.690 as the tenth forward speed.

At the eleventh forward speed (11th), the first and third clutches C1, C3 and the second brake B2 are engaged, and the second and fourth clutches C2, C4 and the first brake B1 are disengaged. Since the fourth sun gear S4 is held stationary, input rotation of the fourth carrier CR4 is output from the fourth ring gear R4 to the second carrier CR2 and the third carrier CR3 via the second coupling element 32. Since the input rotation is also applied to the second sun gear S2, the second ring gear R2 rotates at a rotational speed increased with respect to the second sun gear S2 and the second carrier CR2. Since the first clutch C1 is engaged, the rotation of the second ring gear R2 increased in speed is output to the first ring gear R1. The third ring gear R3 is coupled to the first carrier CR1 via the third clutch C3, and the first sun gear S1 is coupled to the third sun gear S3 by the first coupling element 31. Accordingly, when the rotation thus increased in speed is applied to the first ring gear R1 and the third carrier CR3, rotation of each rotary element is determined, and the first carrier CR1 rotates at a rotational speed higher than that at the tenth forward speed. The output shaft 13 thus rotates so that the gear ratio becomes equal to 0.655 as the eleventh forward speed.

At the twelfth forward speed (12th), the third and fourth clutches C3, C4 and the second brake B2 are engaged, and the first and second clutches C1, C2 and the first brake B1 are disengaged. Since the second brake B2 and the fourth clutch C4 are engaged, the fourth sun gear S4 is held stationary, and the third sun gear S3 is also held stationary. Accordingly, input rotation of the fourth carrier CR4 is increased in speed via the fourth ring gear R4 and is applied to the third carrier CR3. Since the third sun gear S3 is held stationary, the rotation thus applied to the third carrier CR3 is output to the first carrier CR1 via the third ring gear R3 and the third clutch C3. The first carrier CR1 therefore rotates at a rotational speed higher than that at the eleventh forward speed. The output shaft 13 thus rotates so that the gear ratio becomes equal to 0.531 as the twelfth forward speed.

At the reverse speed (Rev), the third and fourth clutches C3, C4 and the first brake B1 are engaged, and the first and second clutches C1, C2 and the second brake B2 are disengaged. Since the second ring gear R2 is held stationary by the first brake B1, input rotation of the second sun gear S2 is reduced in speed and is output from the second carrier CR2. This rotation of the second carrier CR2 is applied to the fourth ring gear R4 and to the third carrier CR3 via the second coupling element 32. The input rotation is also applied to the fourth carrier CR4 similarly to the second sun gear S2. Accordingly, when the rotation reduced in speed is applied to the fourth ring gear R4, the fourth sun gear S4 rotates at an increased rotational speed. This rotation of the fourth sun gear S4 is applied to the third sun gear S3 via the fourth clutch C4, and rotation of the third ring gear R3 is reversed and reduced in speed by this rotation of the third sun gear S3 together with the rotation of the third carrier CR3 reduced in speed. Since the third clutch C3 is engaged, this reversed rotation of the third ring gear R3 is output as it is to the first carrier CR1. The output shaft 13 thus rotates so that the gear ratio becomes equal to −3.214 as the reverse speed.

Configuring the automatic transmission 1 in this manner allows twelve forward speeds and one reverse speed to be attained by using the four planetary gear mechanisms PM1 to PM4, the four clutches C1 to C4, and the two brakes B1, B2. The gear spread from the lowest shift speed to the highest shift speed is thus as wide as 8.546 in the present embodiment, which can improve acceleration performance and fuel economy performance of vehicles. The step ratios between shift speeds for forward traveling do not vary so much and are relatively satisfactory, and smooth shifting to an optimal shift speed can be implemented.

Moreover, each shift speed is attained by engaging three of the six engagement elements and disengaging the remaining three engagement elements. Accordingly, the number of engagement elements to be disengaged to attain a shift speed is relatively small, which can reduce drag loss that is caused by the disengaged engagement elements, and can improve transmission efficiency of the automatic transmission. In particular, the second and third clutches C2, C3 have larger torque capacity (torque sharing ratio) and a larger number of friction plates than the other engagement elements C1, C4, B1, B2, and therefore have greater drag loss. However, since the second and third clutches C2, C3 are engaged at the shift speeds (in the present embodiment, the eighth to tenth forward speeds for the second clutch C2, and the tenth to twelfth forward speeds for the third clutch C3) equal to or higher than the direct coupling shift speed (in the present embodiment, the sixth forward speed) that is frequently used when, e.g., the vehicle travels for a long distance such as when the vehicle travels on an expressway, the transmission efficiency of the automatic transmission can further be improved. Moreover, since the fourth clutch C4 and the second brake B2 can have small torque capacity, the number of friction plates in these friction engagement elements can be reduced, and the overall length and cost of the automatic transmission can be reduced.

In the above automatic transmission, all of the four planetary gear mechanisms PM1 to PM4 are single-pinion type planetary gear mechanisms. This can reduce gear meshing loss and can thus improve the transmission efficiency of the automatic transmission. This can also reduce the number of components and can thus reduce assembly time and cost of the automatic transmission. In particular, in the present embodiment, gear efficiency of 95% or more can be achieved at every forward speed, and the rotational speeds of the pinion gears can be made relatively low.

Second Embodiment

A second embodiment that is obtained by partially changing the first embodiment will be described below with reference to FIGS. 4 and 5. Only the portions changed from the first embodiment will be described in the second embodiment. The other portions are denoted with the same reference characters as those in the first embodiment, and description thereof will be omitted.

Figure 4:
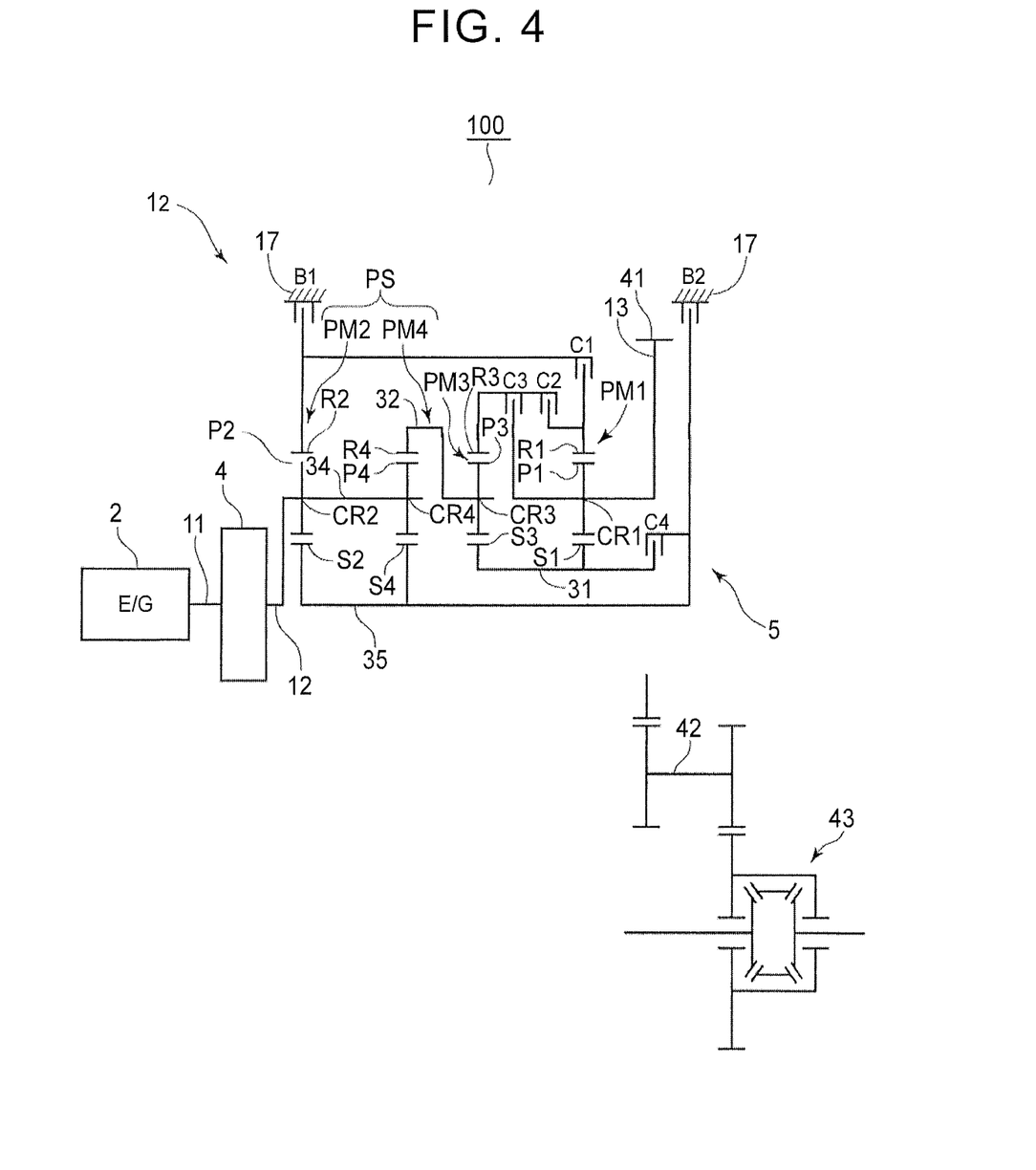
FIG. 4 is a skeleton diagram showing an automatic transmission according to a second embodiment.

As shown in FIG. 4, an automatic transmission $1_2$ according to the second embodiment is different from the automatic transmission $1_1$ according to the first embodiment in the coupling relation between the second planetary gear mechanism PM2 and the fourth planetary gear mechanism PM4 in the compound planetary gear mechanism PS. That is, as shown in FIG. 4, in the automatic transmission $1_2$ according to the second embodiment, the second sun gear S2 is constantly coupled to the fourth sun gear S4 by a fifth coupling element 35, and the second carrier CR2 is constantly coupled to the fourth carrier CR4 by a fourth rotary element 34. Namely, the compound planetary gear mechanism PS includes as four rotary elements the second sun gear S2 and the fourth sun gear S4 (seventh rotary element), the second carrier CR2 and the fourth carrier CR4 (eighth rotary element), the fourth ring gear R4 (ninth rotary element), and the second ring gear R2 (tenth rotary element). The input shaft (input member) 12 is coupled to the second carrier CR2 and the fourth carrier CR4.

Figure 5:
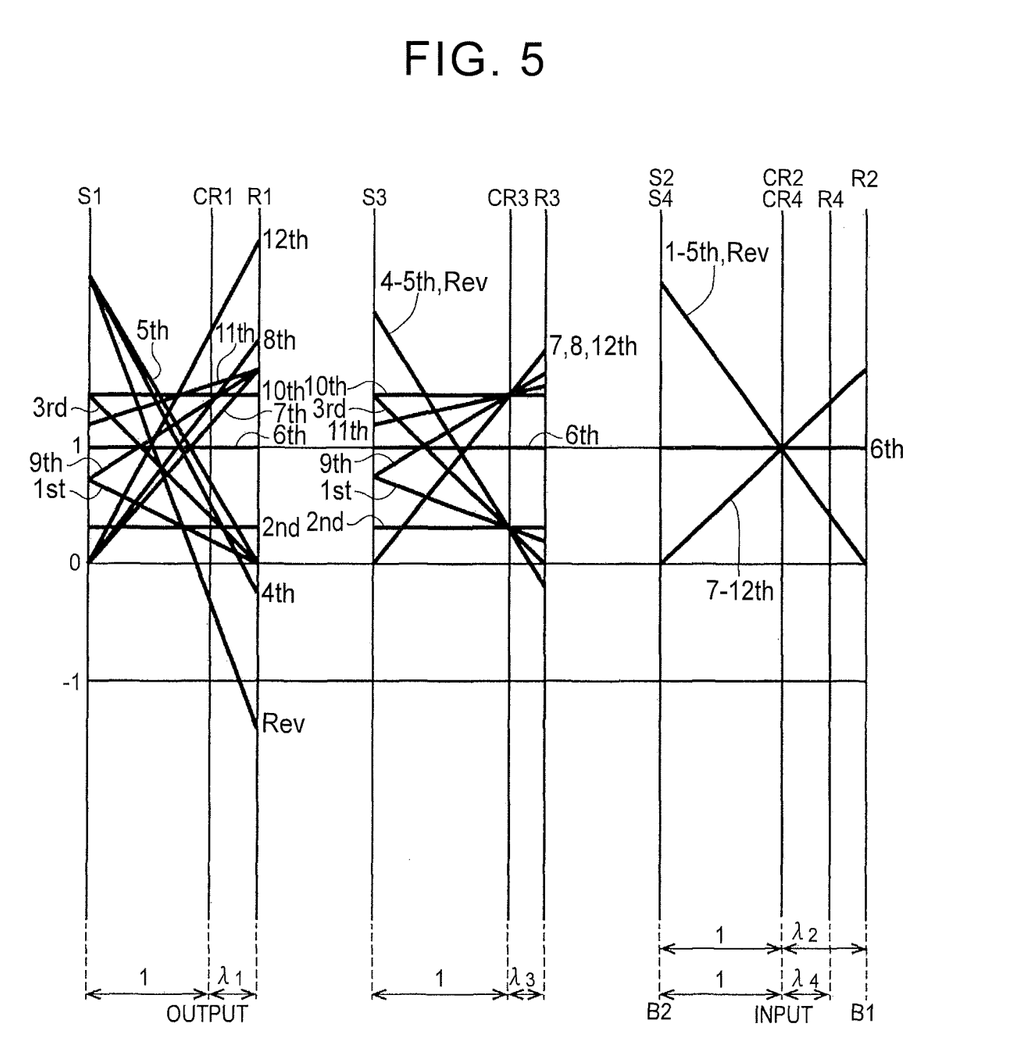
FIG. 5 is a speed diagram of the automatic transmission according to the second embodiment.

Accordingly, as shown in FIG. 5, the second sun gear S2, the second ring gear R2, and the second carrier CR2 as three rotary elements of the second planetary gear mechanism PM2 are shown in order of the second sun gear S2, the second carrier CR2, and the second ring gear R2 according to the interval corresponding to the gear ratio in a speed diagram, and the fourth sun gear S4, the fourth ring gear R4, and the fourth carrier CR4 as three rotary elements of the fourth planetary gear mechanism PM4 are shown in order of the fourth sun gear S4, the fourth carrier CR4, and the fourth ring gear R4 according to the interval corresponding to the gear ratio in the speed diagram. The gear ratio $\lambda_2$ of the second planetary gear mechanism PM2 (the number of teeth of the second sun gear S2/the number of teeth of the second ring gear R2) is set to, e.g., 0.675, and the gear ratio $\lambda_4$ of the fourth planetary gear mechanism PM4 (the number of teeth of the fourth sun gear S4/the number of teeth of the fourth ring gear R4) is set to, e.g., 0.45. In the speed diagram of FIG. 5, the second sun gear S2 and the second carrier CR2 of the three rotary elements of the second planetary gear mechanism PM2 are constantly coupled to the fourth sun gear S4 and the fourth carrier CR4 of the three rotary elements of the fourth planetary gear mechanism PM4, respectively, so that the second sun gear S2 and the fourth sun gear S4 make the same rotation, and the second carrier CR2 and the fourth carrier CR4 make the same rotation. Accordingly, the second sun gear S2 and the fourth sun gear S4, the second carrier CR2 and the fourth carrier CR4, the fourth ring gear R4, and the second ring gear R2 are shown corresponding to the four rotary elements.

Since the configuration, functions, and effects of the second embodiment are otherwise similar to those of the first embodiment, description thereof will be omitted.

In the above embodiments, an internal combustion engine is used as a drive source. However, an electric motor etc. may be used, or a combination of the internal combustion engine and the electric motor may be used as a drive source. Although the automatic transmissions according to the above embodiments can attain at least twelve forward speeds and one reverse speed, it is not necessary to use all the shift speeds.

INDUSTRIAL APPLICABILITY

The automatic transmission according to the present disclosure can be used for vehicles such as passenger cars and trucks, and is preferably used particularly for vehicles that have a wide gear spread and that are desired to have improved transmission efficiency.

The invention claimed is:

1. An automatic transmission that shifts power applied to an input member and outputs the shifted power to an output member, the automatic transmission comprising:
   a first planetary gear mechanism having a first rotary element, a second rotary element, and a third rotary element;
   a third planetary gear mechanism having a fourth rotary element, a fifth rotary element, and a sixth rotary element;
   a compound planetary gear mechanism formed by a second planetary gear mechanism and a fourth planetary gear mechanism, and having a seventh rotary element, an eighth rotary element, a ninth rotary element, and a tenth rotary element;
   a first clutch capable of engaging the third rotary element with the tenth rotary element and disengaging the third rotary element from the tenth rotary element;
   a second clutch capable of engaging the third rotary element with the sixth rotary element and disengaging the third rotary element from the sixth rotary element;
   a third clutch capable of engaging the second rotary element with the sixth rotary element and disengaging the second rotary element from the sixth rotary element;
   a fourth clutch capable of engaging the first rotary element and the fourth rotary element with the seventh rotary element and disengaging the first rotary element and the fourth rotary element from the seventh rotary element;
   a first brake that engages the tenth rotary element with an automatic transmission case so that the tenth rotary element can be held stationary with respect to the automatic transmission case, and that disengages the tenth rotary element from the automatic transmission case; and
   a second brake that engages the seventh rotary element with the automatic transmission case so that the seventh rotary element can be held stationary with respect to the automatic transmission case, and that disengages the seventh rotary element from the automatic transmission case, wherein
   the first rotary element is constantly coupled to the fourth rotary element,
   the fifth rotary element is constantly coupled to the ninth rotary element,
   the input member is coupled to the eighth rotary element, and
   the output member is coupled to the second rotary element.

2. The automatic transmission according to claim 1, wherein
   the first planetary gear mechanism is a single-pinion type planetary gear mechanism having a first sun gear, a first ring gear, and a first carrier that holds a plurality of first pinion gears meshing with the first sun gear and the first ring gear so that the plurality of first pinion gears can rotate and revolve,
   the second planetary gear mechanism is a single-pinion type planetary gear mechanism having a second sun gear, a second ring gear, and a second carrier that holds a plurality of second pinion gears meshing with the second sun gear and the second ring gear so that the plurality of second pinion gears can rotate and revolve,
   the third planetary gear mechanism is a single-pinion type planetary gear mechanism having a third sun gear, a third ring gear, and a third carrier that holds a plurality of third pinion gears meshing with the third sun gear and the third ring gear so that the plurality of third pinion gears can rotate and revolve,
   the fourth planetary gear mechanism is a single-pinion type planetary gear mechanism having a fourth sun gear, a fourth ring gear, and a fourth carrier that holds a plurality of fourth pinion gears meshing with the fourth sun gear and the fourth ring gear so that the plurality of fourth pinion gears can rotate and revolve,
   the first rotary element is the first sun gear,
   the second rotary element is the first carrier,
   the third rotary element is the first ring gear,
   the fourth rotary element is the third sun gear,
   the fifth rotary element is the third carrier,
   the sixth rotary element is the third ring gear,
   the seventh rotary element is the fourth sun gear,
   the eighth rotary element is the fourth carrier and the second sun gear which are constantly coupled to each other,
   the ninth rotary element is the fourth ring gear and the second carrier which are constantly coupled to each other, and
   the tenth rotary element is the second ring gear.

3. The automatic transmission according to claim 1, wherein
   the first planetary gear mechanism is a single-pinion type planetary gear mechanism having a first sun gear, a first ring gear, and a first carrier that holds a plurality of first pinion gears meshing with the first sun gear and the first ring gear so that the plurality of first pinion gears can rotate and revolve, the second planetary gear mechanism is a single-pinion type planetary gear mechanism having a second sun gear, a second ring gear, and a second carrier that holds a plurality of second pinion gears meshing with the second sun gear and the second ring gear so that the plurality of second pinion gears can rotate and revolve, the third planetary gear mechanism is a single-pinion type planetary gear mechanism having a third sun gear, a third ring gear, and a third carrier that holds a plurality of third pinion gears meshing with the third sun gear and the third ring gear so that the plurality of third pinion gears can rotate and revolve, the fourth planetary gear mechanism is a single-pinion type planetary gear mechanism having a fourth sun gear, a fourth ring gear, and a fourth carrier that holds a plurality of fourth pinion gears meshing with the fourth sun gear and the fourth ring gear so that the plurality of fourth pinion gears can rotate and revolve, the first rotary element is the first sun gear,
the second rotary element is the first carrier,
the third rotary element is the first ring gear,
the fourth rotary element is the third sun gear,
the fifth rotary element is the third carrier,
the sixth rotary element is the third ring gear,
the seventh rotary element is the fourth sun gear and the second sun gear which are constantly coupled to each other,
the eighth rotary element is the fourth carrier and the second carrier which are constantly coupled to each other,
the ninth rotary element is the fourth ring gear, and
the tenth rotary element is the second ring gear.

4. The automatic transmission according to claim 1, wherein
a first forward speed is attained by engaging the first clutch, the third clutch, and the first brake and disengaging the second clutch, the fourth clutch, and the second brake,
a second forward speed is attained by engaging the second clutch, the third clutch, and the first brake and disengaging the first clutch, the fourth clutch, and the second brake,
a third forward speed is attained by engaging the first clutch, the second clutch, and the first brake and disengaging the third clutch, the fourth clutch, and the second brake,
a fourth forward speed is attained by engaging the second clutch, the fourth clutch, and the first brake and disengaging the first clutch, the third clutch, and the second brake,
a fifth forward speed is attained by engaging the first clutch, the fourth clutch, and the first brake and disengaging the second clutch, the third clutch, and the second brake,
a sixth forward speed is attained by engaging the first clutch, the third clutch, and the fourth clutch and disengaging the second clutch, the first brake, and the second brake,
a seventh forward speed is attained by engaging the first clutch, the fourth clutch, and the second brake and disengaging the second clutch, the third clutch, and the first brake,
an eighth forward speed is attained by engaging the second clutch, the fourth clutch, and the second brake and disengaging the first clutch, the third clutch, and the first brake,
a ninth forward speed is attained by engaging the first clutch, the second clutch, and the second brake and disengaging the third clutch, the fourth clutch, and the first brake,
a tenth forward speed is attained by engaging the second clutch, the third clutch, and the second brake and disengaging the first clutch, the fourth clutch, and the first brake,
an eleventh forward speed is attained by engaging the first clutch, the third clutch, and the second brake and disengaging the second clutch, the fourth clutch, and the first brake,
a twelfth forward speed is attained by engaging the third clutch, the fourth clutch, and the second brake and disengaging the first clutch, the second clutch, and the first brake, and
a reverse speed is attained by engaging the third clutch, the fourth clutch, and the first brake and disengaging the first clutch, the second clutch, and the second brake.

5. The automatic transmission according to claim 2, wherein
a first forward speed is attained by engaging the first clutch, the third clutch, and the first brake and disengaging the second clutch, the fourth clutch, and the second brake,
a second forward speed is attained by engaging the second clutch, the third clutch, and the first brake and disengaging the first clutch, the fourth clutch, and the second brake,
a third forward speed is attained by engaging the first clutch, the second clutch, and the first brake and disengaging the third clutch, the fourth clutch, and the second brake,
a fourth forward speed is attained by engaging the second clutch, the fourth clutch, and the first brake and disengaging the first clutch, the third clutch, and the second brake,
a fifth forward speed is attained by engaging the first clutch, the fourth clutch, and the first brake and disengaging the second clutch, the third clutch, and the second brake,
a sixth forward speed is attained by engaging the first clutch, the third clutch, and the fourth clutch and disengaging the second clutch, the first brake, and the second brake,
a seventh forward speed is attained by engaging the first clutch, the fourth clutch, and the second brake and disengaging the second clutch, the third clutch, and the first brake,
an eighth forward speed is attained by engaging the second clutch, the fourth clutch, and the second brake and disengaging the first clutch, the third clutch, and the first brake,
a ninth forward speed is attained by engaging the first clutch, the second clutch, and the second brake and disengaging the third clutch, the fourth clutch, and the first brake,
a tenth forward speed is attained by engaging the second clutch, the third clutch, and the second brake and disengaging the first clutch, the fourth clutch, and the first brake, an eleventh forward speed is attained by engaging the first clutch, the third clutch, and the second brake and disengaging the second clutch, the fourth clutch, and the first brake, a twelfth forward speed is attained by engaging the third clutch, the fourth clutch, and the second brake and disengaging the first clutch, the second clutch, and the first brake, and a reverse speed is attained by engaging the third clutch, the fourth clutch, and the first brake and disengaging the first clutch, the second clutch, and the second brake.

6. The automatic transmission according to claim 3, wherein a first forward speed is attained by engaging the first clutch, the third clutch, and the first brake and disengaging the second clutch, the fourth clutch, and the second brake, a second forward speed is attained by engaging the second clutch, the third clutch, and the first brake and disengaging the first clutch, the fourth clutch, and the second brake, a third forward speed is attained by engaging the first clutch, the second clutch, and the first brake and disengaging the third clutch, the fourth clutch, and the second brake, a fourth forward speed is attained by engaging the second clutch, the fourth clutch, and the first brake and disengaging the first clutch, the third clutch, and the second brake, a fifth forward speed is attained by engaging the first clutch, the fourth clutch, and the first brake and disengaging the second clutch, the third clutch, and the second brake, a sixth forward speed is attained by engaging the first clutch, the third clutch, and the fourth clutch and disengaging the second clutch, the first brake, and the second brake, a seventh forward speed is attained by engaging the first clutch, the fourth clutch, and the second brake and disengaging the second clutch, the third clutch, and the first brake, an eighth forward speed is attained by engaging the second clutch, the fourth clutch, and the second brake and disengaging the first clutch, the third clutch, and the first brake, a ninth forward speed is attained by engaging the first clutch, the second clutch, and the second brake and disengaging the third clutch, the fourth clutch, and the first brake, a tenth forward speed is attained by engaging the second clutch, the third clutch, and the second brake and disengaging the first clutch, the fourth clutch, and the first brake, an eleventh forward speed is attained by engaging the first clutch, the third clutch, and the second brake and disengaging the second clutch, the fourth clutch, and the first brake, a twelfth forward speed is attained by engaging the third clutch, the fourth clutch, and the second brake and disengaging the first clutch, the second clutch, and the first brake, and a reverse speed is attained by engaging the third clutch, the fourth clutch, and the first brake and disengaging the first clutch, the second clutch, and the second brake.

* * * * *